US012774951B2

(12) United States Patent
Kalwa

(10) Patent No.: US 12,774,951 B2
(45) Date of Patent: Oct. 27, 2026

(54) METHOD FOR DETERMINING THE AMOUNT OF AT LEAST ONE SEALANT APPLIED TO A SIDE EDGE OF A COMPOSITE WOOD BOARD

(71) Applicant: Flooring Technologies Ltd., Kalkara (MT)

(72) Inventor: Norbert Kalwa, Horn-Bad Meinberg (DE)

(73) Assignee: Flooring Technologies Ltd., Kalkara (MT)

( * ) Notice: Subject to any disclaimer, the term of this patent is extended or adjusted under 35 U.S.C. 154(b) by 54 days.

(21) Appl. No.: 18/838,333

(22) PCT Filed: Jan. 26, 2023

(86) PCT No.: PCT/EP2023/051871
§ 371 (c)(1),
(2) Date: Aug. 14, 2024

(87) PCT Pub. No.: WO2023/156160
PCT Pub. Date: Aug. 24, 2023

(65) Prior Publication Data

US 2025/0146934 A1 May 8, 2025

(30) Foreign Application Priority Data

Feb. 15, 2022 (EP) .................................... 22156728

(51) Int. Cl.
*G01N 21/359* (2014.01)
*G01N 21/3577* (2014.01)
*G01N 21/86* (2006.01)

(52) U.S. Cl.
CPC ....... *G01N 21/359* (2013.01); *G01N 21/3577* (2013.01); *G01N 21/86* (2013.01); *G01N 2201/0438* (2013.01)

(58) Field of Classification Search
CPC .. G01N 21/359; G01N 21/3577; G01N 21/86; G01N 21/3563; G01N 21/8422; G01N 2201/0438; G01N 2021/8427; G01N 2201/129
See application file for complete search history.

(56) References Cited

U.S. PATENT DOCUMENTS 10,655,338 B2 * 5/2020 D'Hondt ........... E04F 15/02038
2004/0195714 A1 10/2004 Mbachu et al.
(Continued)

FOREIGN PATENT DOCUMENTS

DE 4305991 C1 6/1994
DE 19963203 A1 9/2001
(Continued)

OTHER PUBLICATIONS

WO2020016176A1 with paragraph numbers (Year: 2020).*
(Continued)

*Primary Examiner* — Tarifur R Chowdhury
*Assistant Examiner* — Carlos Perez-Guzman
(74) *Attorney, Agent, or Firm* — The Webb Law Firm

(57) ABSTRACT

A method for determining the amount of at least one sealing agent applied to at least one side edge of a wood-based board comprising the steps of: recording at least one NIR spectrum of a plurality of reference samples of at least one sealing agent applied to a side edge of a wood-based board; assigning the application amount of the at least one sealing agent of the reference samples to the recorded NIR spectra of the reference samples; and creating a calibration model for the relationship between the spectral data of the NIR spectra and the application amounts of the impregnating agent of the reference samples; recording at least one NIR spectrum of at least one sealing agent applied to a side edge; determining the application amount of the at least one sealing agent by comparing the NIR spectrum recorded for the sealing agent with the calibration model created.

21 Claims, 5 Drawing Sheets

(56) References Cited

U.S. PATENT DOCUMENTS

| | | | | |
|---|---|---|---|---|
| 2007/0131862 | A1* | 6/2007 | Cowan | G01N 21/274 250/339.09 |
| 2016/0123871 | A1* | 5/2016 | Kalwa | G01N 21/3563 250/340 |
| 2018/0080867 | A1* | 3/2018 | Denk | G01N 21/359 |
| 2021/0324228 | A1 | 10/2021 | Kalwa et al. | |
| 2023/0145539 | A1 | 5/2023 | Kalwa | |
| 2024/0201080 | A1 | 6/2024 | Kalwa | |
| 2024/0239001 | A1* | 7/2024 | Benz | B29D 99/001 |

FOREIGN PATENT DOCUMENTS

| | | | | |
|---|---|---|---|---|
| DE | 102021122622 | A1 * | 1/2023 | C09J 5/06 |
| EP | 1026341 | B1 | 8/2003 | |
| EP | 3428619 | B1 * | 11/2019 | G01N 21/274 |
| EP | 4080195 | A1 | 10/2022 | |
| WO | 2007021235 | A1 | 2/2007 | |
| WO | 2016182896 | A1 | 11/2016 | |
| WO | 2020016176 | A1 | 1/2020 | |
| WO | 2021191254 | A1 | 9/2021 | |

OTHER PUBLICATIONS

EP_3428619_B1 with page numbers (Year: 2019).*
"Doppelendprofilierer—Einzelmaschine", accessed 2023.
"Doppelendprofiler", Website Winter Holztechnik, 2023, accessed at <https://www.winterholztechnik. de/winter-maschinen/fraesen/doppelendprofiler.html> (accessed Jul. 18, 2024).
"Technology program", Schiele Coating Intelligence, accessed 2023.
Thoemen et al., "Wood-Based Panels", An Introduction for Specialists, Brunel Univ, 2010, pp. 72-73.

* cited by examiner

METHOD FOR DETERMINING THE AMOUNT OF AT LEAST ONE SEALANT APPLIED TO A SIDE EDGE OF A COMPOSITE WOOD BOARD

CROSS-REFERENCE TO RELATED APPLICATIONS

This application is the United States national phase of International Patent Application No. PCT/EP2023/051871 filed Jan. 26, 2023, and claims priority to European Patent Application No. 22156728.2 filed Feb. 15, 2022, the disclosures of which are hereby incorporated by reference in their entireties.

BACKGROUND

Technical Field

The present invention relates to a method for determining the application amount and, if necessary, penetration of at least one sealing agent onto or into a side edge of a wood-based board.

Technical Description

Laminate flooring has been manufactured and sold worldwide for more than twenty years. As a result, this floor covering has a more or less large market share in the flooring segment in almost all markets worldwide. Today, laminate flooring is almost exclusively a product with a fiberboard backing that is coated with synthetic resin-impregnated paper using the so-called direct coating process. The large-format, coated boards are then used to produce panels on milling lines.

Compared to many other floor coverings, laminate flooring benefits from its image as a wood product. However, like many other wood products, laminate flooring is sensitive to the effects of moisture or water.

This has proven to be all the more critical as more and more manufacturers have switched to so-called “glueless profiles”. Here, the flooring panels are fitted with tongue and groove profiles on the side edges for laying to panel compounds, such as laminate flooring. The tongue-and-groove profiles enable easy installation of floor panels to floor coverings. Such tongue and groove profiles have a tongue (or spring) with a (first) joint surface provided above the tongue in a first side edge and a groove with a lip with a (second) joint surface in a second side edge. When the panels are installed, the tongue and groove are pushed into each other so that the first and second joining surfaces come into contact. However, this approach causes a gap on the upper side of the joined panels, and here in particular at the contact points of the joining surfaces of the two opposing side edges of two joined floor panels, through which moisture and dirt can penetrate between the floor panels.

To reduce the ingress of water at the contact points of the tongue and groove profiles, modern click profiles also have a rebate in the area of the joining edge. A rebate is a step, an edge or a fold.

Laminate flooring with so-called V-joints has also proved to be very popular. These V-joints are formed with bevels when laying flooring panels. The bevels are angled cut-outs on the side edges of the floor panels, which are painted with colored lacquers and give the laminate flooring a visual impression similar to parquet.

However, all these panel connection variants still offer insufficient protection against water penetration at the connection or contact point. This is due to the fact that water is drawn into the profile area through the fine joints or gaps between the flooring panels via capillary forces (e.g. during cleaning) and causes swelling there. To test this problem, the so-called NALFA test was developed, in which a defined amount of water is applied to the joint area between three installed floorboards. After a defined test period (24 h), it is analyzed whether there is still water on the surface and whether there is clearly visible swelling of the panels.

To improve the watertightness of the profiles, sealing agents have been tested for application to the profiles to remedy this deficiency. These can be sealing agents that merely form a film and thus prevent or at least make it more difficult for water to penetrate. However, they can also be agents that react with the fiberboard. This is described, for example, in WO 216/182896 A1, Unilin North America, LLC. There, the use of isocyanates reduces swelling and water absorption in the profile area.

However, it is difficult to apply the sealing agents at the production speeds normally used on flooring lines. On modern flooring lines, these speeds are in excess of 200 m/min. The same applies to controlling the application amounts. Coloring the substances could at least enable simple visual control, but has the problem that the decorative surface could be soiled by overspray. However, colorless sealing agents can also be problematic with regard to overspray, as they can lead to large-area soiling and/or sticking when the boards are stacked on top of each other.

In addition, this control says little about the exact application amount. Depending on which agent is used, this can also be absorbed by the rather absorbent fiberboard. This can be a particular problem with paraffins, as these are absorbed particularly well by wood fibers (blotting paper effect). This problem can occur to a greater or lesser extent depending on the density of the fiberboard. The type of wood fiber can also play a role.

Of course, panels could be removed from the milling lines at regular intervals and examined. However, considerable amounts may have been produced between the last and the current removal. In addition, a purely visual inspection would not be conclusive due to the absorbency of the fiberboard.

The resulting disadvantages include difficulty in controlling the amount of sealing agent applied, high machine speed and the strong influence of the fiberboard. In addition, continuous analysis is not possible.

SUMMARY

The invention is therefore based on the technical object of checking the application amounts of the sealing agent on the side edges, in particular on profile surfaces, joint surfaces and/or chamfers of side edges, of wood-based boards and its distribution as continuously as possible in a non-destructive manner. If possible, this should be possible for a variety of sealing agents without having to use different measuring systems. A measurement should also be able to detect not only the sealing agent directly on the surface but also material that has penetrated the fiberboard. The measurement should not be spatially demanding and should not be restricted by the conditions on site (dust). It should be possible to change from one sealing agent to another quickly with regard to the measurements.

This object is solved by a method with features as described herein.

Accordingly, a method for determining the application amount of at least one sealing agent or impregnating agent on at least one side edge, in particular on profile surfaces, joint surfaces and/or chamfers of side edges, of a wood-based board, preferably a floor panel, is provided. The present method comprises the following steps:

Recording at least one NIR spectrum of a plurality of reference samples of at least one sealing agent applied to a side edge of a wood-based board, wherein the at least one sealing agent has been applied in a known amount to the one side edge of a wood-based board, using at least one NIR measuring head in a wavelength range between 700 nm and 2000 nm, preferably between 900 nm and 1700 nm, in particular preferably between 1100 nm and 1700 nm, even more preferably between 1200 nm and 1700 nm, or also preferably between 1150 and 1250 nm and/or between 1350 nm and 1650 nm;

Assigning the application amount of the at least one sealing agent of the reference samples to the recorded NIR spectra of the reference samples; and Creating a calibration model for the correlation between the spectral data of the NIR spectra and the application amounts of the sealing agent of the reference samples by means of multivariate data analysis;

Recording at least one NIR spectrum of at least one sealing agent applied to a side edge using the at least one NIR measuring head in a wavelength range between 700 nm and 2000 nm, preferably between 900 nm and 1700 nm, more preferably between 1100 nm and 1700 nm, even more preferably between 1200 nm and 1700 nm, or also preferably between 1150 and 1250 nm and/or between 1350 nm and 1650 nm; and Determining the application amount of the at least one sealing agent by comparing the NIR spectrum recorded for the sealing agent with the calibration model created.

According to the present method, the application amount of the sealing agent is determined by NIR measurement in the areas of the profile that are exposed to the sealing agents (in particular the profile areas close to the surface), the joint surfaces and/or chamfers of the side edges of wood-based boards. A wide variety of sealing agents can be detected and evaluated in terms of amount. As will be described in detail later, the sealing agents used are film-forming compositions that preferably consist of non-crosslinked materials or components. In particular, no curable formaldehyde-containing resins are used as sealing agents for the side edges.

In addition, NIR spectroscopy also offers the possibility of detecting sealing agents that have penetrated the fiberboard at the side edges. This can occur not only with paraffin but also with materials that have a low viscosity. The detection of sealing agent in the surface of the board is not possible with IR spectroscopy or other spectroscopic methods, for example.

In addition to determining the application amount (and distribution) of the at least one sealing agent on a side edge of a wood-based board, the present method therefore also makes it possible to determine the penetration of the sealing agent (e.g. the penetration depth of the sealing agent) into the side edge of the at least one wood-based board. Determining the penetration of the sealing agent into the wood-based board is particularly advantageous in the case of low-viscosity sealing agents or sealing agents with a high-water content.

In one embodiment of the present method, the recorded NIR spectrum, in combination with a test of the percentage of penetration of the sealing agent into the side edge, thus enables a correlation to the penetration depth. Surprisingly, it has been shown that, depending on how far the sealing agent penetrates into the side edge, an increase in the signal for the main peak of the respective sealing agent can be observed.

It is known from the prior art (e.g. WO 2020/016176 A1) to measure a melamine-formaldehyde resin layer by means of NIR spectroscopy, which is applied to the planar surface of wood-based boards, but not to the side edges of wood-based boards. However, the coating of a narrow surface/profile/bevel of a wood-based board and the measurement of a sealing layer applied to a narrow surface/profile/bevel is technically more challenging and more prone to errors than the coating of a surface.

In addition, the planar surface and side edges of wood-based boards differ in that the surface of the wood-based boards has a pressed skin due to the pressing process, which at least makes it more difficult for liquid to penetrate, while such a pressed skin is not present on the side edges, so that a liquid can be absorbed more easily at the side edges of the wood-based boards. Instead, the side edges of wood-based boards are open-pored, which allows penetration and penetration of the sealing agent applied to the side edges.

Due to the pressing process, wood-based boards also have a lower bulk density in the central area of the panel than on the planar surface of the panel, which has a much higher bulk density. Accordingly, a liquid, such as a sealing agent, can penetrate the panel much better at the side edges in the central panel area than at the panel surface. This problem is not mentioned in WO 2020/016176 A1, as only one layer applied to the planar surface of a wood-based board is measured here.

The present measuring method also takes into account the high production speeds, which place significantly higher demands on the analytics than a slow-running system. For example, the speed of a production plant, in particular a plant for applying a sealing agent to a side edge, is between 100 and 250 m/min, preferably between 120 and 200 m/min, in particular preferably between 150 and 180 m/min. The measurement along the side edge of a wood-based board, in particular in the form of a panel, is carried out at at least one, preferably 3-4 different measuring points. Since NIR spectroscopy involves several scans per second, this means that at a system speed of the milling line of 200 m/min (3.3 m/sec), for example, and a measuring frequency of 8 NIR measurements/see, it is ensured that each panel passing through is measured several times.

The advantages of this method include the possibility of on-line measurement, analysis of different sealing agents, fast correction, determination of the total application amount, no coloring of the sealing agent necessary.

According to the present method, an NIR spectrum of the side edge of the wood-based board coated with the sealing agent is recorded. NIR radiation is generated and directed onto the sample to be analyzed with the coated surface, where the NIR radiation interacts with the components of the sample and is reflected or scattered. An NIR detector captures the reflected or scattered NIR radiation and generates an NIR spectrum that contains the desired chemical information of the sample. During this measurement, a large number of individual NIR measurements are carried out in one second, so that statistical validation of the measured values is also guaranteed. NIR spectroscopy together with multivariate data analysis (see below) offers a way of establishing a direct link between the spectral information (NIR spectra) and the parameters of the applied sealing agent to be determined.

First, reference samples of a wood-based board are provided, the side edge of which is coated with the respective sealing agent. It is essential that the reference sample is identical to the sample to be measured; i.e. in particular, the sealing agent and the wood-based board with the side edge of the reference sample to be coated have the same composition as the sample to be measured. The similarity of the sample to be measured and the reference sample is essential, especially when using sealing agents with solvents and possibly other additives.

At least one NIR spectrum is recorded from these reference samples in a wavelength range between 700 nm and 2000 nm, preferably between 900 nm and 1700 nm, particularly preferably between 1100 nm and 1700 nm, even more preferably between 1200 nm and 1700 nm, or also preferably between 1150 nm and 1250 nm and/or between 1350 nm and 1650 nm.

The respective application amount of the at least one sealing agent of the reference samples is then assigned to the NIR spectra of these reference samples recorded in each case, and a calibration model is created for the relationship between the spectral data of the NIR spectra of the reference samples and the associated parameter values (application amount) using multivariate data analysis; i.e. an NIR spectrum of the reference sample corresponds to each parameter value of the reference sample. The calibration models created for the various parameters are stored in a suitable data memory.

At least one sealing agent is then applied to a side edge of a wood-based board and at least one NIR spectrum of the applied sealing agent is recorded. The desired parameter of the sealing agent (here the application amount and penetration depth into the side edge) can then be determined by comparing the NIR spectrum recorded for the sample with the calibration model created.

It is therefore possible to determine several parameters of interest of the applied sealing agent simultaneously from a single NIR spectrum determined for the sample to be measured by means of an automated comparison or comparison with the calibration models created for the respective parameters.

It makes sense to compare and interpret the NIR spectra over the entire recorded spectral range. This is advantageously carried out using a well-known multivariate data analysis (MDA). In multivariate analysis methods, several statistical variables are typically analyzed simultaneously in a known manner. For this purpose, these methods usually reduce the number of variables contained in a data set without simultaneously reducing the information contained therein.

In this case, the multivariate data analysis is carried out using the partial least squares regression (PLS) method, which allows a suitable calibration model to be created. The evaluation of the data obtained is preferably carried out using suitable analysis software, such as the SIMCA-P analysis software from Umetrics AB or The Unscrambler from CAMO.

In a further embodiment, it is intended to use spectral data from the NIR spectral range between 1150 and 1250 nm and/or between 1350 and 1650 nm for the creation of the calibration model, which are pre-treated using suitable mathematical methods and then fed to the multivariate data analysis.

The significance of a wavelength for the prediction of parameters of the applied sealing agent, such as application amount and penetration, from the NIR spectrum is shown with the aid of the regression coefficients. The regions with large coefficient amounts have a strong influence on the regression model. For example, the representation of the regression coefficients in a PLS regression model for determining the sealing agent shows that the wavelength range between 1150 and 1250 nm and/or between 1400 nm and 1600 with a maximum at 1490 nm is most important for calculating the model, as the amounts of the regression coefficients are greatest here. Although the other ranges in the spectrum have less information content in relation to the NIR measurement, they still help to take into account or minimize the other information or interfering influencing variables.

To eliminate interfering influences (such as the partially rough nature of the surface of the side edges of the wood-based board), it is necessary to process the spectral data using mathematical pre-treatment methods (e.g, derivative data pre-treatment, standardization according to SNVT (Standard Normal Variate Transformation), multiplicative signal correction (EMSC, Extended Multiplicative Signal Correction, etc.). The baseline effects, which are mainly caused by the different colors of the samples, are removed from the spectra, overlapping bands are separated and the dependence of the light scattering on the substrate surface is taken into account. Data pretreatment is therefore preferably carried out to reduce light scattering on the rough surface of the substrate. During measurement, the focus of calibration and data pretreatment is on removing the baseline shift.

A calibration model is developed from the pre-treated data using multivariate data analysis, which includes all aspects used in the calibration.

Accordingly, the NIR spectra are preferably compared and interpreted in the spectral range between 1150 and 1250 nm and/or between 1350 and 1650 nm using multivariate data analysis (MDA). In multivariate analysis methods, several statistical variables are typically analyzed simultaneously in a known manner. For this purpose, the number of variables contained in a data set is reduced without simultaneously reducing the information contained therein.

The present method makes it possible to provide the measured values in a short time (online, preferably without disruptive time delay) compared to conventional (known) measurement methods. The measurement data can be used for quality assurance, research and development, process monitoring, regulation, control, etc. The measuring process does not reduce the production speed etc. Basically, it improves the monitoring of production. In addition, downtimes are also reduced due to quality determinations and system adjustments.

The advantages of this method are manifold: non-contact multi-parameter determination ("real time" or "real-time" measurement) with significantly reduced time delay in the evaluation of the measured parameter values; improved system control and regulation, reduction of rejects, improvement of the quality of the products manufactured on the system, improvement of system availability.

In one embodiment of the present method, the at least one wood-based board is a medium-density fiberboard (MDF), high-density fiberboard (HDF) or oriented strand board (OSB), plywood or a wood-plastic panel (WPC).

The width of the side edge to be coated with the sealing agent is between 2.5 and 3.5 mm, preferably 3 mm.

In one embodiment, the at least one sealing agent has a solids content of between 30 and 100% by weight, preferably between 50 and 100% by weight, in particular between 70 and 100% by weight. The sealing agent is preferably present as a suspension, in particular as an aqueous suspension. In a preferred embodiment, aqueous suspensions with a solids content of 50-70% by weight and a water content of 30-50% by weight are used.

In a further embodiment, the at least one sealing agent is applied to the side edge in an amount of between 0.1 g liq/rm and 1.5 g liq/rm, preferably between 0.2 and 1.5 g liq/rm, in particular preferably between 0.25 and 0.75 g liq/rm, e.g. preferably of 0.5 g liq/rm.

As sealing agent, a composition comprising at least one compound of the general formula (I) $SiX^1_4$ wherein $X^1$ is alkoxy-, aryloxy-, acyloxy-, at least one compound of the general formula (II) $R^2_b\ SiX^2_{(4-b)}$, wherein $X^2$ is H or alkoxy-, aryloxy-, acyloxy-, $R^2$ is a non-hydrolyzable organic radical $R^2$ selected from the group comprising alkyl and aryl, and b=1, 2, 3, or 4, and at least one aqueous polymer dispersion. Such a composition is described in WO2020/016176 A1, This silane-containing sealing agent allows the pores in the wood fiberboard to be filled and the wood fibers to be coated, thereby "sealing" them. On the other hand, the use of hydrophobic modifications creates a "hydrophobization" of the remaining pores and the uncoated wood fibres. The silane compounds are mixed with a suitable aqueous polymer dispersion in order to achieve the highest possible flexibility of the coating. The polymers used have functional groups that are compatible with the inorganic silane matrix. It is therefore possible to produce a coating with a high degree of cross-linking even at low temperatures.

The radical $X^1$ is advantageously selected from a group comprising $C_{1-6}$-alkoxy, in particular methoxy, ethoxy, n-propoxy and butoxy, $C_{6-10}$-aryloxy, in particular phenoxy, $C_{2-7}$-acyloxy, in particular acetoxy or propionoxy, and the radical $X^2$ is advantageously selected from a group comprising H, $C_{1-6}$-alkoxy, in particular methoxy, ethoxy, n-propoxy and butoxy, $C_{6-10}$-aryloxy, in particular phenoxy, $C_{2-7}$-acyloxy, in particular acetoxy or propionoxy, In a particularly preferred variant of the silane-containing sealing agent, the compound of the general formula (I) corresponds to the formula $SiX^1_4$, where the radical $X^1$ is alkoxy, in particular methoxy, ethoxy, n-propoxy or i-propoxy. Tetramethoxysilane and tetraethoxysilane are used as particularly preferred crosslinkers.

In a further embodiment of the silane-containing sealing agent, the non-hydrolyzable organic radical $R^2$ of the compound according to formula (II) is selected from a group comprising $C_1$-$C_{15}$-alkyl, in particular $C_1$-$C_{10}$-alkyl, and $C_6$-$C_{10}$-aryl. These may be unsubstituted or substituted with a further hydrophobic group. It is preferred if the non-hydrolyzable organic radical $R^2$ is selected from the group comprising methyl, ethyl, n-propyl, isopropyl, n-butyl, s-butyl, t-butyl, pentyl, hexyl, heptyl, octyl, nonyl, cyclohexyl, phenyl and naphthyl. Particularly preferred are methyl, ethyl, propyl, octyl or phenyl radicals.

The compound of formula (II) may in particular comprise one of the following formulae:

- $R^2_4$ Si with $R^2$ as C1-C5 alkyl group, preferably methyl or ethyl such as tetramethylsilane;
- $R^2_3\ SiX^2$ with $R^2$ as C1-C5 alkyl group, preferably methyl or ethyl and with $X^2$ as H, such as trimethylsilane,
- $R^2\ SiX^2_3$ with $R^2$ as C1-C10 alkyl group, preferably methyl, ethyl, propyl, pentyl, hexyl, heptyl, octyl, or as C6-C10 aryl group, preferably phenyl and with $X^2$ as alkoxy, in particular methoxy, ethoxy, n-propoxy or i-propoxy, such as octyltriethoxysilane, phenyltriethoxysilane.

In one variant of the silane-containing sealing agent, a compound of the general formula (I) and a compound of the general formula (II) are each used as an additive.

In a further variant of the silane-containing sealing agent, however, at least one compound of the general formula (I) and at least two, preferably at least three compounds of the general formula (II) may also be present in the additive. Any combination is conceivable here.

In a further embodiment of the silane-containing sealing agent, the at least one polymer is selected from the group comprising polyurethanes, epoxy resins; and polyacrylates. In the present embodiment, the use of a polyurethane polymer is preferred, wherein the polyurethane polymer is based on aromatic polyisocyanates, in particular polydiphenylmethane diisocyanate (PMDI), toluene diisocyanate (TDI) and/or diphenylmethane diisocyanate (MDI), PMDI being particularly preferred. The polymer is incorporated into the network formed from the silane compounds and imparts flexible properties to the composition which facilitate application.

A silane with hydrophobic residues, such as trimethylsilane, phenyltriethoxysilane and octyltriethoxysilane, preferably in a mixture with another (hydrophilic) silane, such as tetraethoxysilane, is preferably used (WO 2020/016176 A1). Alcohols, in particular ethanol, or water are used as solvents. The solids content of the sealing agent used in this case is 50% by weight.

In a further embodiment of the silane-containing sealing agent, at least one bevel color is added to the mixture of silanes and polymer dispersion. Such a sealing agent is used in particular for coating chamfers.

In a further embodiment, the at least one bevel color used in the present composition comprises color pigments and an aqueous solvent or suspending agent. The color pigments used are carbon black, iron oxides, titanium dioxide and/or organic pigments. Suitable solvents or suspending agents are melamine-resin-formaldehyde resins or acrylates. In one embodiment, the chamfer paint comprises color pigment, acrylate and water.

In a further embodiment, the at least one bevel color used comprises color pigments and an aqueous solvent or suspending agent. The color pigments used are carbon black, iron oxides, titanium dioxide and/or organic pigments. Suitable solvents or suspending agents are melamine-resin-formaldehyde resins or acrylates. In one embodiment, the chamfer paint comprises color pigment, acrylate and water.

The silane-containing sealing agent, in particular the composition of silanes, polymer dispersion and bevel color, has a viscosity (measured according to EN ISO 2431:2011, Coating materials-Determination of flow time with flow cups, 21° C.) with a flow time between 20 and 100 sec, preferably between 30 and 80 sec, more preferably between 35 and 60 sec over a period of at least 30 minutes, preferably of at least 60 minutes, more preferably of at least 120 minutes.

In a further embodiment, at least one isocyanate is used as the sealing agent. Preferred isocyanates are polydiphenylmethane diisocyanate (PMDI), toluene diisocyanate (TDI) and/or diphenylmethane diisocyanate (MDI). The use of diphenylmethane diisocyanate (MDI) is particularly preferred. MDI is preferably applied with a solids content of 100%.

It is possible to use the isocyanate alone or in combination with other sealing agents. For example, a mixture of MDI and an epoxy resin and acetic anhydride can be used. Acetic anhydride leads to acetylation of the wood fibers, making the wood fibers less susceptible to moisture.

It is also possible that the at least one isocyanate comprises at least one solvent as a sealing agent. Suitable solvents are water, a glycol ether, such as dipropylene glycol dimethyl ether, ethyl acetate, propyl acetate, butyl acetate, acetone, butyl diphenyl methane, tetramethoxy ether, benzoic acid ester. The use of hydrophobic solvents such as propyl acetate, diphenyl methane and diphenyl ethane has proven to be particularly advantageous. The proportion of solvent is 10-40% by weight, preferably 15-30% by weight.

In a further embodiment, a UV varnish, in particular a monomer-free UV varnish, can be used as a sealing agent. A suitable UV varnish would be a water-based copolymer of ethylene-acrylic acid. Such products form a stable hydrophobic layer.

In a still further embodiment, a hot melt adhesive can be used as a sealing agent. Suitable hot melt adhesives are polypropylene (PP), polysulfones, polyurethanes (PUR), polyetherimides and/or polyolefin. The hot melt adhesives are applied at temperatures between 15° and 200° C.

It is also possible to use paraffin as a sealing agent. Paraffin is a mixture of acyclic alkanes (saturated hydrocarbons) with the general molecular formula $C_nH_{2n+2}$ with n between 18-32 and can be used as a liquid or solid. Preferably, the paraffin is applied to the side edges as an emulsion with a solids content of 50% by weight.

As already indicated above, the sealing agents to be applied to the side edges of wood-based boards are compositions which preferably form a film on the side edge. In a preferred form, these compositions consist of at least two or three or more components which are present in uncrosslinked form prior to application. Accordingly, the precursors contained in the composition are measured. This applies in particular to the silane-containing sealing agents described above.

If mixtures of different components are used, aqueous suspensions are often used here, e.g. with a water content of 50% by weight. However, the measurement of suspensions with a high water content using NIR spectroscopy is not trivial, as the water signal (at approx. 1450 nm) in the NIR spectrum partially overlaps the NIR signals of the undercoat components essential for the film formation of the sealing agent and makes a meaningful evaluation difficult. Accordingly, the present method requires careful analysis of the NIR spectrum determined.

As already mentioned, formaldehyde resins such as melamine-formaldehyde resin or urea-formaldehyde resin, which are typically used for coating the planar surface of wood-based boards and impregnating paper layers, are not used as sealing agents for side edges. Therefore, no resins that cure or can be cured, in particular by condensation or polycondensation reactions, are used as sealing agents.

The sealing agent can be applied to the edges of the wood-based boards, e.g. by spraying with a spray system, rolling, transfer printing or using a vacuum and transfer wheel. Suitable vacuums for overspray-free, profile-independent vacuum coating or partial coating of profile elements are marketed by Schiele (Vacumat®). Transfer wheels enable the coating of chamfers (TransferDisc from Schiele).

As already indicated, the sealing agent is applied in particular to the side edges of floorboards. The floorboards used in the present case preferably have the following formats: Length between 1200 and 2000 mm, preferably between 1300 and 1500 mm, more preferably between 1350 and 1400 mm, such as 1375 mm, 1380 mm, 1875 mm; Width between 100 and 300 mm, preferably between 150 mm and 250 mm, more preferably between 180 and 200 mm, such as 157 mm, 188 mm, 193 mm, 244 mm. Typical formats are 1380×193 mm; 1380×244 mm; 1380×157 mm; 1375×188 mm; 1875×244 mm.

The format size of the panels in combination with the system speed (200 m/min) plays a major role in the development of a measuring method suitable for side edges. The NIR measurements are taken eight times per second. This means that a measurement is taken on a panel approximately every 40 cm (3-4 measurements per side edge per panel). This ensures that fluctuations in the application (panel infeed/outfeed) can be detected. Another, slower analysis method than the NIR spectroscopy used here could not cope with this task.

The layer thickness of the sealing agent on the side edge can be in a range between 10 and 50 μm, preferably between 20 and 40 μm. However, it is also possible for the layer thickness of the sealing agent on the side edge to be less than 10 μm, as the sealing agent has largely penetrated into the wood-based board.

The wood-based boards used herein may have various binder systems which are mixed and pressed with the wood fibers or wood particles as binders. Preferred binder systems are: Formaldehyde resins, such as urea-formaldehyde resins, melamine-formaldehyde resins, melamine-urea-formaldehyde resins; polyurethanes, preferably based on polydiphenylmethane diisocyanate (PMDI), epoxy resin or polyester resins.

The present wood-based boards can also have a coating on the top side of the panel with films, e.g. films made of thermoplastic materials such as PVC or PP, or paper layers, such as decorative paper layers or overlay papers.

Particularly preferred wood-based boards, especially in the form of floorboards, are:

- HDF board with urea-formaldehyde glue
- HDF board with urea-formaldehyde glue and film, such as PVC film, glued to at least one top side of the board;
- HDF board with melamine-urea-formaldehyde glue;
- HDF board with PMDI glue, and
- WPC board with glued-on film, such as polypropylene (PP) film.

In a further embodiment, it is provided that the side edge of the wood-based board to be provided with the sealing agent and a side edge opposite thereto comprise mechanical coupling means which enable the wood-based board to be coupled or connected to similar wood-based boards to form a composite (panel composite).

Preferably, the mechanical coupling means are provided in the form of a tongue and groove. For example, a floor panel for realizing a floor covering is known from EP 1026341 B1, wherein coupling parts in the form of a groove and a tongue are provided on the edges of two opposite sides of the panels. The tongue and groove are designed in such a way that, when two or more floor panels are joined together, a clamping force is exerted on one another which forces the floor panels together. The clamping force is caused by an elastically bendable lip in the groove, which is at least partially bent in the joined state and in this way provides the aforementioned clamping force.

In a further variant, the NIR measurement can be carried out both online and offline.

The present method is carried out in a production line comprising at least one NIR multi-measuring head, preferably at least two NIR multi-measuring heads, in particular preferably at least four measuring heads (two measuring heads for the longitudinal edges and two measuring heads for the transverse edges) and at least one control system. Such a production line can be a production line for manufacturing material plates. Preferably, the present method for determining the amount of sealing agent applied to the side edges is carried out continuously and online.

The control system of the production line comprises at least one computerized evaluation unit (or processor unit) and a database. In the evaluation unit, the NIR spectrum measured for the product (i.e. side edges coated with the sealing agent) is compared with the calibration models created for the individual parameters. The parameter data determined in this way is stored in the database.

The data determined using this spectroscopic method can be used to control the production line. The non-contact measured parameter values of the NIR multi-measurement head ("actual values") can, as described above, be used directly and in "real time" for the control or regulation of the relevant system, for example by storing the actual values measured and stored in the database, e.g. a relational database, and comparing them with the target values of these parameters available there. The resulting differences are then used to control or regulate the production line.

A computer-implemented method and a computer program comprising instructions which, when the program is executed by a computer, cause the computer to execute the computer-implemented method, are provided for matching and controlling the production line. The computer program is stored in a memory unit of the production line control system.

BRIEF DESCRIPTION OF THE DRAWINGS

The invention is explained in more detail below with reference to the figures in the drawings using an embodiment example.

DETAILED DESCRIPTION

Example 1

Sealing agents were applied to a glueless floor profile on the tongue side in the area below the decor in a width of approx. 3 mm and over the entire length of the panels. The sealing agents were paraffin, aromatic isoycanates (MDI) and silanes with aliphatic chains (trimethylsilane, phenyltriethoxysilane and octyltriethoxysilane in a mixture with tetraethoxysilane). The same sealing agent was also applied to the groove side in a width of 3 mm and over the entire length of the panels underneath the decor. This was done on the long and short sides.

The application amount was approx. 0.5 g sealing agent liq/rm. Apart from the sealing agent containing isocyanate, which had a solids content of 100%, the other sealing agents had a solids content of approx. 50%. The panels were subjected to intermediate drying with hot air.

An NIR measuring head was then used to create a spectrum of the area provided with the sealing agent in the run. This was repeated with different sealing agents on other floorboards. A zero sample without sealing agent was also measured.

Figure 1:
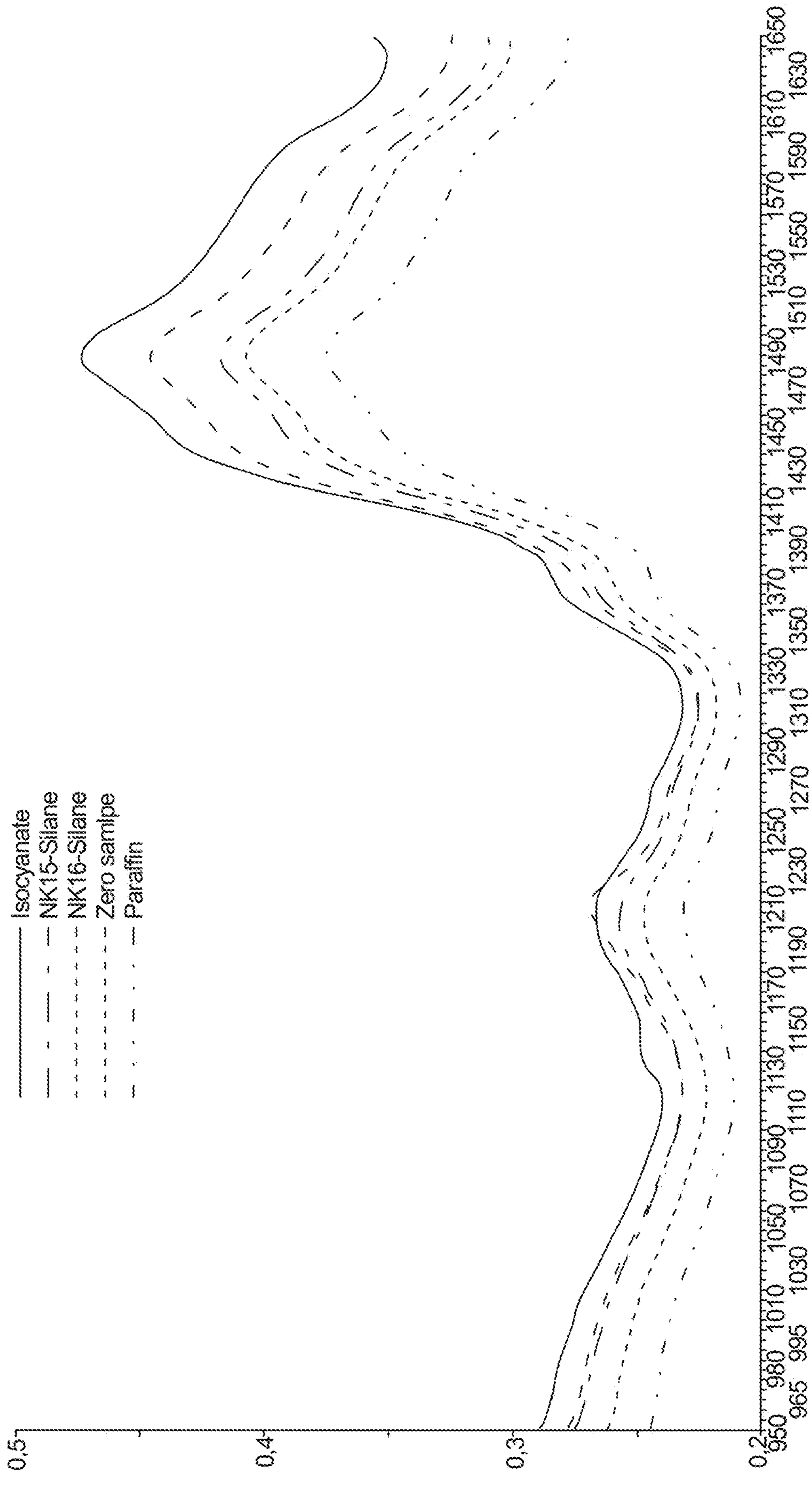
FIG. 1 shows NIR spectra of various sealing agents applied to a side edge or chamfer of a wood-based board.

As can be seen from the diagram in FIG. 1, even chemically very different compounds are detected. This is surprising, as the sealing agents are chemically very different compounds.

The NIR spectra of the sealing agents show clear bands (methyl/methylene groups), particularly in the range of approx. 1500 nm (wavelength: 6666 $cm^{-1}$), which allow an evaluation of the applied amounts. However, other areas of the spectrum such as the range around 1200-1220 nm (8333-8200 $cm^{-1}$) are also suitable for evaluation.

Example 2

Sealing agents were applied to a glueless floor profile on the tongue side of the bevel in a width of approx. 3 mm and over the entire length of the panels. The sealing agents were paraffin, aromatic isoycanates (MDI) and silanes with aliphatic chains (trimethylsilane, phenyltriethoxysilane and octyltriethoxysilane in a mixture with tetraethoxysilane). The same sealing agent was also applied to the groove side in a width of 3 mm and over the entire length of the panels on the bevel. This was done on the longitudinal and transverse sides.

The application amount was approx. 0.5 g sealing agent liq/rm. Apart from the sealing agent containing isocyanate, which had a solids content of 100%, the other sealing agents had a solids content of approx. 50%. The panels were subjected to intermediate drying with hot air.

An NIR measuring head was then used to create a spectrum of the area provided with the sealing agent in the run. This was repeated with different sealing agents on other floorboards. A zero sample without sealing agent was also measured.

As can be seen from the diagram in FIG. 1, even chemically very different compounds are detected. This is surprising, as the sealing agents are chemically very different compounds.

The NIR spectra of the sealing agents show clear bands (methyl/methylene groups), particularly in the range of approx. 1500 nm (wavelength: 6666 $cm^{-1}$), which allow an evaluation of the applied amounts. However, other areas of the spectrum such as the range around 1200-1220 nm (8333-8200 $cm^{-1}$) are also suitable for evaluation.

Example 3

Paraffin emulsion was applied as a sealing agent to a glueless floor profile on the tongue side in the area below the decor in a width of approx. 3 mm and over the entire length of the panels. The emulsion had a solids content of approx. 50%. The paraffin was also applied to the groove side in a width of 3 mm and over the entire length of the panel underneath the decor. This was carried out with the same application amount on another panel. It was found that a paraffin film could be felt and seen on the surface of both panels.

Both panels were subjected to intermediate drying with hot air. One of the two panels was treated with a hot air dryer until the paraffin on the surface could no longer be felt. This was done on the longitudinal and transverse sides. An NIR measuring head was then used to create a spectrum of the area with the sealing agent in the run. A zero sample without sealing agent was also measured.

Figure 2:
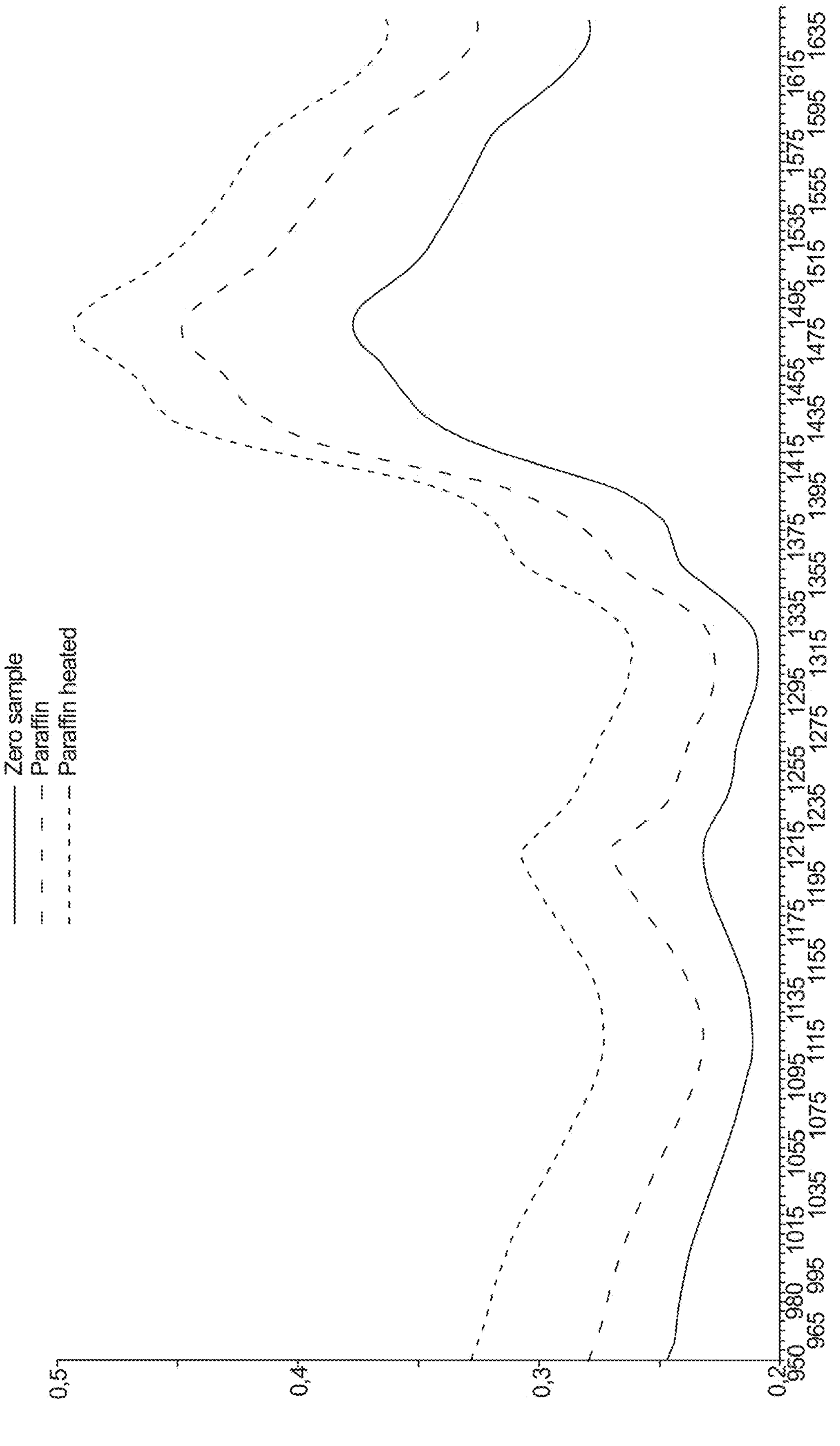
FIG. 2 shows NIR spectra of paraffin as a sealing agent applied to a side edge of a wood-based board.

As can be seen from the diagram in FIG. 2, the paraffin that had essentially migrated into the fiberboard after treatment was still detected.

Example 4

Paraffin emulsion was applied as a sealing agent to a glueless floor profile on the tongue side in the area below the decor in a width of approx. 3 mm and over the entire length of the panels. The emulsion had a solids content of approx. 50%. The paraffin was also applied to the groove side in a width of 3 mm and over the entire length of the panel underneath the decor. This was carried out with different application amounts on several panels. The application amounts were approx. 0.25, 0.5 and 1 g paraffin emulsion liq./rm. It was found that a paraffin film could be felt on the surface of the panel with the last two application amounts.

All panels were subjected to intermediate drying with hot air. A set of samples with the same application amounts was heated with a hot air gun after application until the paraffin had penetrated the fiberboard. This was done on the longitudinal and transverse sides. An NIR measuring head was then used to create a spectrum of the area with the sealing agent in the run. A zero sample without sealing agent was also measured in each case.

Figure 3:
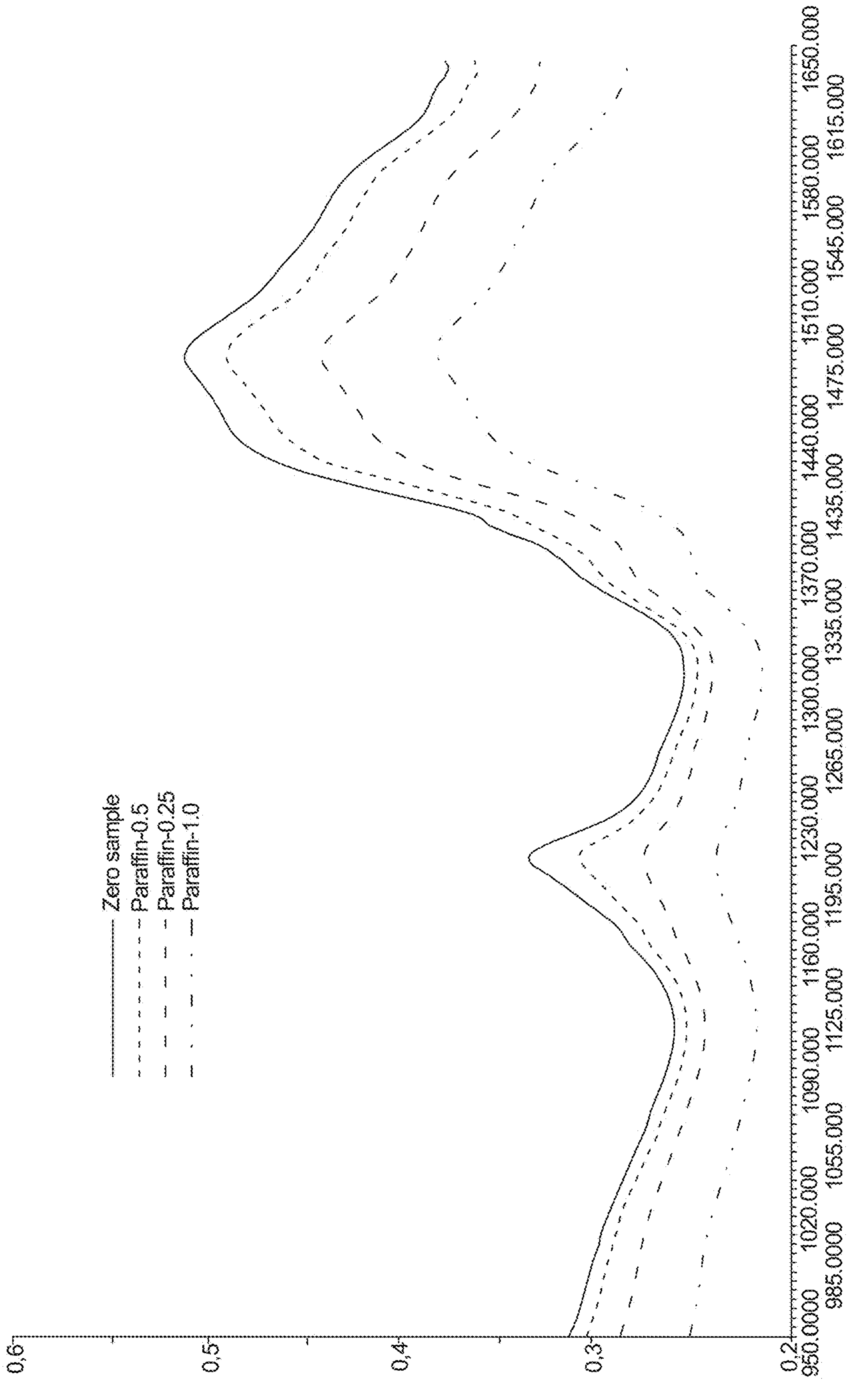
FIG. 3 shows NIR spectra of paraffin in various amounts as a sealing agent applied to a side edge of a wood-based board before heating.
Figure 4:
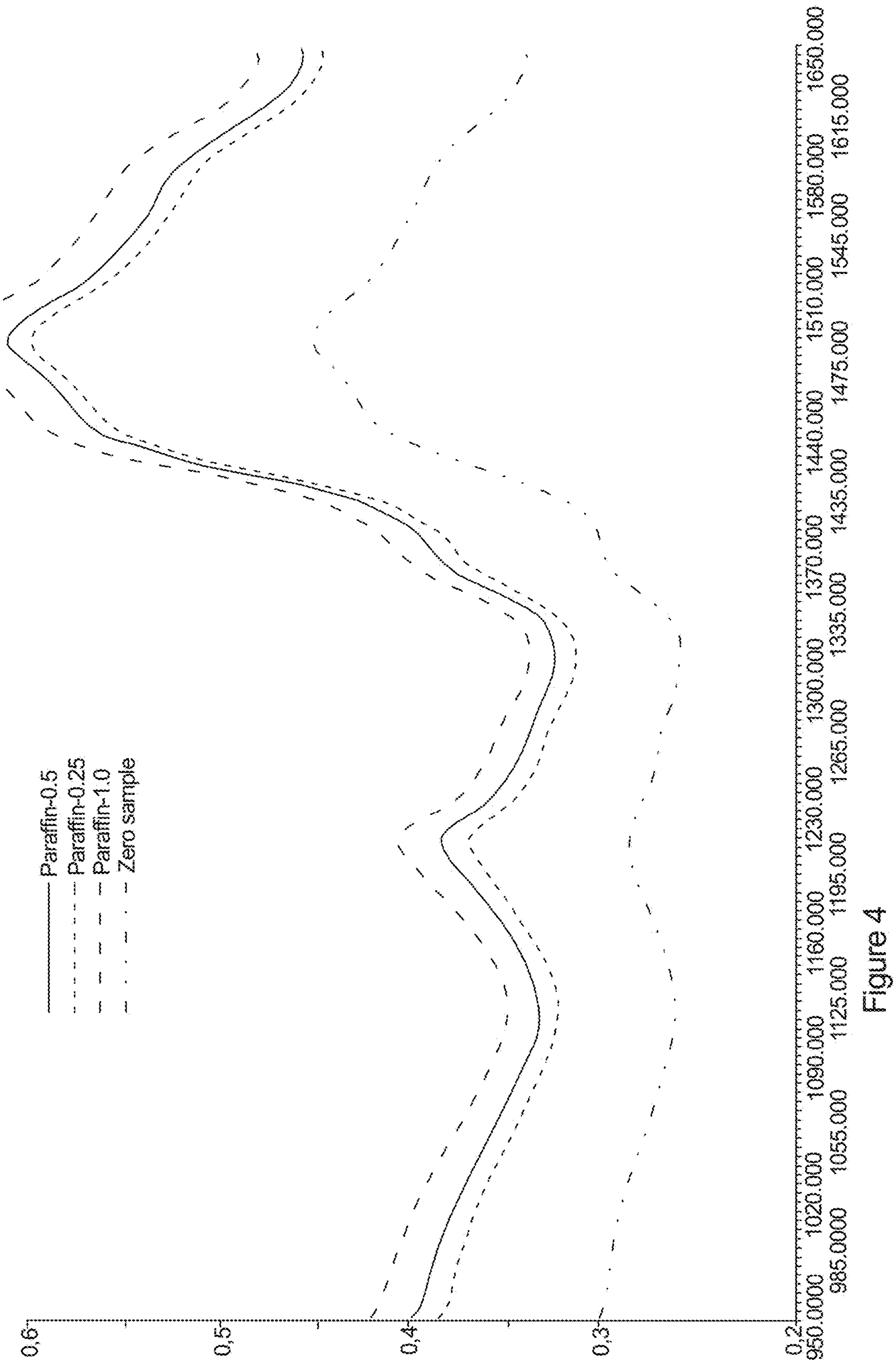
FIG. 4 shows a NIR spectra of paraffin in various amounts as sealing agents applied to a side edge of a wood-based board after heating.

As can be seen from the diagrams in FIGS. 3 and 4, the amount gradations were recorded. This shows that even very small application amounts can be reliably recorded.

Example 5

Preparation of a First Silane-Containing Sealing Composition:

12.3 g ocyltriethoxysilane, 2.4 g trimethylsilane, 6.1 g phenyltriethoxysilane, 20.8 g tetraethoxysilane and 28.8 g of an aqueous $SiO_2$ dispersion (50% by weight) from Obermaier are added, heated to 80° C. and stirred. 3.6 g para toluene acid in water (30% by weight) is now added while stirring and stirred for 120 minutes. After a further 24 hours, the pH value is raised to 7 by adding a 25% ammonia solution (6.2 g in the above example) while stirring.

After a further stirring time of 2 hours, 80 g of water is added, stirred again for 30 minutes and then the suspension is stored for 4 hours without stirring.

After this waiting time, the aqueous phase with the binder content separates from the ethanolic phase. The aqueous phase is now separated using a separating funnel. The inorganic aqueous coating system is thus obtained.

50 g of this coating system (solid: 52%) is now mixed with 20 g of an aqueous polyurethane solution (Alberdingk U 3251, solid: 35%).

The coating system can now be applied to an edge using a foam roller or pipette.

An NIR measuring head was then used to create a spectrum of the area with sealing agent in the run. A zero sample without sealing agent was also measured in each case.

Example 6

Preparation of a Second Silane-Containing Sealing Composition:

Production of Dispersion A)

28.8 g of an aqueous $SiO_2$ dispersion (Köstrosol 3550) and 20 g of an aqueous Alberdingk U 3215 polyurethane solution are added.

Production Solution B)

In parallel, 12.3 g ocyltriethoxysilane, 2.4 g trimethylsilane, 6.1 g phenyltriethoxysilane, 20.8 g tetraethoxysilane and 28.8 g water are heated to 50° C. and stirred, then 2.8 g sulphuric acid is added and stirred for 120 minutes. This solution is then stirred into the above suspension while still warm and stirred at room temperature for a further 60 minutes. A 0.1 molar NaOH solution is added until a pH value of 7.5 is reached.

After standing for 24 hours, the alcoholic phase is separated using a separating funnel.

The additive (Inosil AS) can now be added up to 50% by weight to a commercially available chamfer paint, which remains stable for several weeks. Curing after application takes place thermally (e.g. 100° C., 5 minutes).

The mixture of bevel color and silane additive (Inosil AS) was applied to a glueless floor profile in a continuous flow on the tongue side in the area below the decor in a width of approx. 3 mm and over the entire length of the panel as a sealing agent. The mixture of bevel color and silane additive was also applied to the groove side in a width of 3 mm and over the entire length of the panel underneath the decor.

This was carried out with different application amounts (see Table 1) on several panels.

| Sample | Application amount chamfer color + Inosil AS (1/1) |
|---|---|
| 1 | Zero sample |
| 2 | 200 g/m2 = 0.125 g/rm |
| 3 | 400 g/m2 = 0.25 g/rm |
| 4 | 800 g/m2 = 0.5 g/rm |

An NIR measuring head was then used to create a spectrum of the area with sealing agent in the run. A zero sample without sealing agent was also measured in each case.

Figure 5:
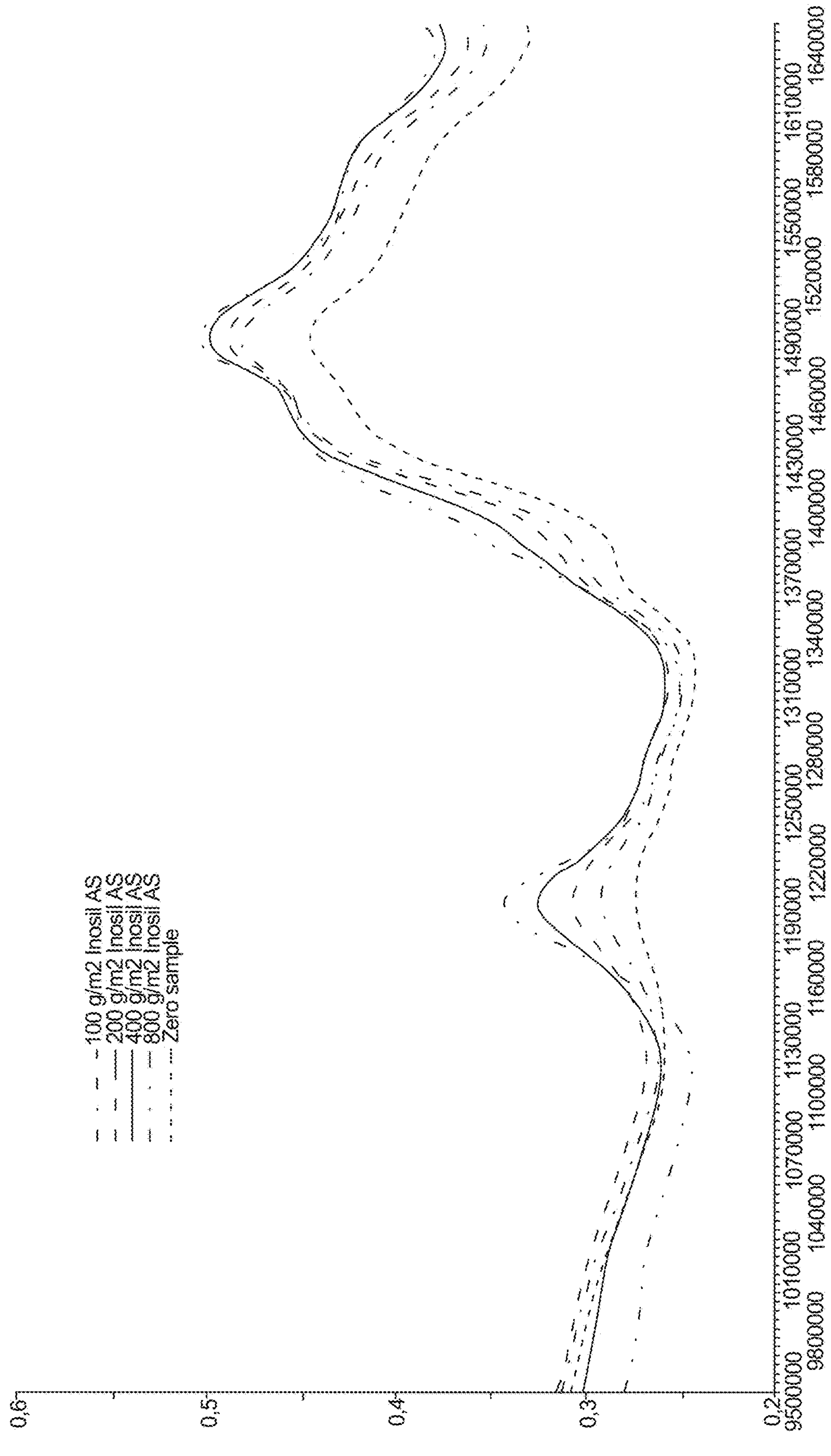
FIG. 5 shows NIR spectra of a mixture of silane, polymer dispersion and beveling paint applied as a sealing agent to a side edge of a wood-based board.

As can be seen from the diagram in FIG. 5, the amount gradations were recorded. This shows that even very small application amounts can be reliably detected. The differences in the application amounts can be evaluated in the spectrum at at least two points in the NIR spectrum (1150 to 1250 nm and 1350 to 1650 m). A malfunction (zero sample) is also easily recognizable.

The invention claimed is:

1. A measuring method for determining the application amount of at least one sealing agent on at least one side edge of a wood-based board in a continuously running production line for applying the sealing agent, wherein the measuring method comprises the following steps:

recording of at least one NIR spectrum of a plurality of reference samples of at least one sealing agent applied to a side edge of a wood-based board, wherein the at least one sealing agent has been applied in a known amount to the one side edge of a wood-based board, using at least one NIR measuring head in a wavelength range between 700 nm and 2000 nm;

assigning the application amount of the at least one sealing agent of the reference samples to the recorded NIR spectra of the reference samples; and creating a calibration model for the correlation between the spectral data of the NIR spectra and the application amounts of the impregnating agent of the reference samples by means of multivariate data analysis;

recording of at least one NIR spectrum of at least one sealing agent applied to a side edge using the at least one NIR measuring head in a wavelength range between 700 nm and 2000 nm;

determining the application amount of the at least one sealing agent by comparing the NIR spectrum recorded for the sealing agent with the calibration model created;

controlling a production line condition(s) based upon the determination of the application amount of the at least one sealing agent to the side edge of the wood-based board, wherein the production line runs continuously at a speed of between 100 and 250 m/min.

2. The measuring method according to claim 1, wherein the side edges have at least one of profiled surfaces, joining surfaces and chamfers to which the sealing agent is applied.

3. The measuring method according to claim 1, wherein the penetration of the sealing agent into the side edge of the at least one wood-based board is determined.

4. The measuring method according to claim 1, wherein the measurement is carried out along the side edge of a wood-based board at at least one measuring point.

5. The measuring method according to claim 1, wherein the at least one wood-based board is a medium-density fibre (MDF), high-density fibre (HDF) or oriented strand board (OSB), plywood panel or a wood-plastic panel (WPC).

6. The measuring method according to claim 1, wherein the at least one sealing agent is an isocyanate, toluene diisocyanate (TDI), a fluorocopolymer, an epoxy resin, acetic acid anhydride, paraffin.

7. The measuring method according to claim 1, wherein the at least one sealing agent is a mixture of at least one compound of the general formula (I) $SiX^1_4$ wherein $X^1$ is alkoxy-, aryloxy-, acyloxy-, at least one compound of the general formula (II) $R^2_b\ SiX^2_{(4-b)}$, wherein $X^2$ is H or alkoxy-, aryloxy-, acyloxy-, $R^2$ is a non-hydrolyzable organic radical $R^2$ selected from the group comprising alkyl and aryl, and b=1, 2, 3, or 4, at least one aqueous polymer dispersion.

8. The measuring method according to claim 1, wherein the at least one sealing agent comprises at least one solvent.

9. The measuring method according to claim 8, wherein the at least one solvent is water, a glycol ether, ethyl acetate, acetone, butyl diphenyl methane, tetramethoxy ether.

10. The measuring method according to claim 1, wherein the at least one sealing agent has a solids content of between 30 and 100% by weight.

11. The measuring method according to claim 1, wherein the sealing agent is used as a suspension.

12. The measuring method according to claim 11, wherein an aqueous suspension with a solids content of 50-70% by weight and a water content of 30-50% by weight is used as the sealing agent.

13. The measuring method according to claim 11, wherein spectral data from the entire recorded spectral range are used to create the calibration model.

14. The measuring method according to claim 1, wherein spectral data from the NIR spectral range at least one of between 1150 and 1250 nm and between 1350 nm and 1550 nm are used to create the calibration model, which are pretreated using suitable mathematical methods and then fed to the multivariate data analysis.

15. The measuring method according to claim 1, wherein at least one of the determination of the application amount and penetration of the sealing agent into the side edge of the wood-based board is carried out continuously and online.

16. The measuring method according to claim 1, wherein the side edge of the wood-based board to be provided with the sealing agent and a side edge opposite thereto comprise mechanical coupling means which enable the wood-based board to be coupled or connected to similar wood-based boards to form a composite, wherein the composite is a panel composite.

17. The measuring method according to claim 16, wherein the mechanical coupling means are provided in the form of a groove and a tongue.

18. The measuring method according to claim 1, wherein the production line runs continuously at a speed between 120 and 200 m/min.

19. The measuring method according to claim 1, wherein the production line runs continuously at a speed of between 150 and 180 m/min.

20. The measuring method according to claim 1, wherein using at least one NIR measuring head in a wavelength range between 900 nm and 1700 nm.

21. The measuring method according to claim 1, wherein the at least one sealing agent further comprises at least one bevel color.

* * * * *